Feb. 9, 1965 L. H. REDFORD ETAL 3,168,937
CONTROLLED DECLINE ELEVATOR WORK STATION APPARATUS
FOR CARCASS SPLITTING AND THE LIKE
Filed Oct. 21, 1963 2 Sheets-Sheet 1

INVENTORS
LLOYD H. REDFORD,
& ANTHONY M. GARCIA
BY
WATTS & FISHER

ATTORNEYS

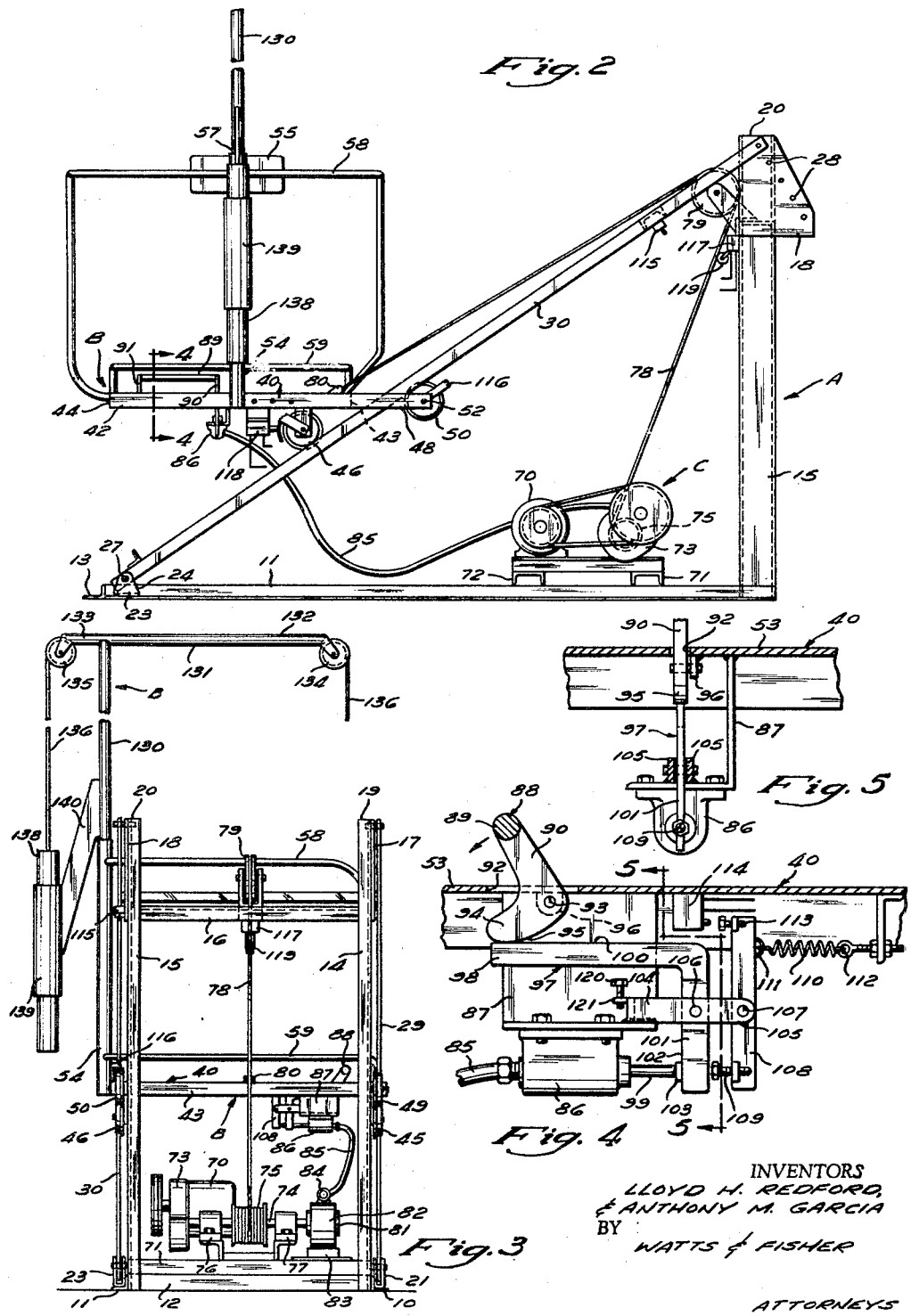

3,168,937
CONTROLLED DECLINE ELEVATOR WORK STATION APPARATUS FOR CARCASS SPLITTING AND THE LIKE
Lloyd H. Redford and Anthony M. Garcia, Cleveland, Ohio, assignors to Earl C. Gibbs, Inc., Cleveland, Ohio
Filed Oct. 21, 1963, Ser. No. 317,576
15 Claims. (Cl. 182—14)

The present invention relates broadly to an elevator apparatus for use in splitting or halving the carcasses of beef-cattle and the like, and more particularly to a controlled decline elevator apparatus used as a work station for a carcass splitter to stand upon while splitting and scribing the carcass of a meat animal, where such animal is suspended head down from a moving overhead conveyor and spreading mechanism.

Since the introduction of the overhead conveyor system for moving slaughtered meat animals progressively from one station to another during the process of dressing the carcass of such animals for the market, it has been found that the carcass splitting operation has limited the forward movement of such conveyor system and unnecessarily delayed the operators working at the other dressing stations. A high degree of skill and accuracy is required by the carcass splitter to make a uniform carcass split while using a cutting saw weighing approximately one-hundred forty pounds. It is an important aid in making a satisfactory split to have the work station so that its height will permit the splitter to stand erect in front of the carcass during the entire splitting operation.

The art of carcass splitting had a work station platform that moved in a vertical or up and down direction and which required the carcass splitter, while splitting a large carcass either to stop the forward movement of the conveyor, or to walk along the platform while the conveyor was moving. In the first such case, the stopping of the conveyor caused delay at the other work stations of the meat dressing operation. In the second such case, it was impossible for the carcass splitter accurately to split a carcass through the longitudinal center of the chine of the carcass being cut.

A principal object of the invention is to provide a work station having an elevator movement, in a direction obliquely to a horizontal, and with controls thereon, to enable the carcass splitter to use such controls during the splitting operation, to synchronize the forward movement of the work station with the forward movement of the carcass in order to maintain a juxtaposition with the forward progression movement of the carcass on the overhead conveyor, and synchronize the downward movement of the work station with the downward progress of the cutting tool, such as a beef splitting saw, in order to maintain a juxtaposition between the carcass and cutting tool.

Another object of the invention is to provide such a work station having foot-operated elevator movement controls, attached to the floor thereof, to enable the carcass splitter to actuate the power means and the brake means on the support frame of the elevator to maintain the desired descending progression movement of the elevator while the hands of the operator are engaged with the cutting tool and the carcass being cut, and to move the elevator upward to reposition it in order to be in readiness to split the next approaching carcass, without the stoppage of the overhead carcass carrying conveyor.

Still another object of the invention is to provide such a work station having a foot-operated elevator movement control unit, attached to the floor thereof, for use by the carcass splitter, in which the controls are arranged so that the engagement of one control for the movement of the elevator in one direction simultaneously disengages the control for the movement of the elevator in the opposite direction.

Still another object of the invention is to provide such a work station elevator having an overhead tool support frame attached thereto, having sheaves mounted on the overhead portion thereof that carry a plastic-coated wire rope with the carcass splitting tool attached to an end thereof so that it is suspended from said support frame adjacent the animal carcass and a counterweight attached to the other end of said plastic-coated wire rope so that it is suspended from said support frame remote from said carcass.

Other objects and advantages of the invention reside in a structure of the aforementioned character that is simple and practical of construction, strong and reliable in use, economical of manufacture and maintenance, as well as efficient of use.

Other objects and advantages more or less ancillary to the foregoing, and the manner in which all the various objects are realized will appear in the following description, which considered in connection with the accompanying drawings, sets forth the preferred embodiment of the invention.

Referring to the drawings:

FIG. 2 is a rear elevation view of the work station elevator apparatus with the overhead support unit for the cutting tool broken away;

FIG. 3 is an end elevation view of the work station elevator apparatus taken from the right of FIG. 2;

FIG. 4 is an enlarged sectional view of the control mechanism taken along the line 4—4 of FIG. 2;

FIG. 5 is an enlarged sectional view taken along a line 5—5 of FIG. 4 and showing the support for the control mechanism affixed to the under side of the elevator platform.

Figure 1:
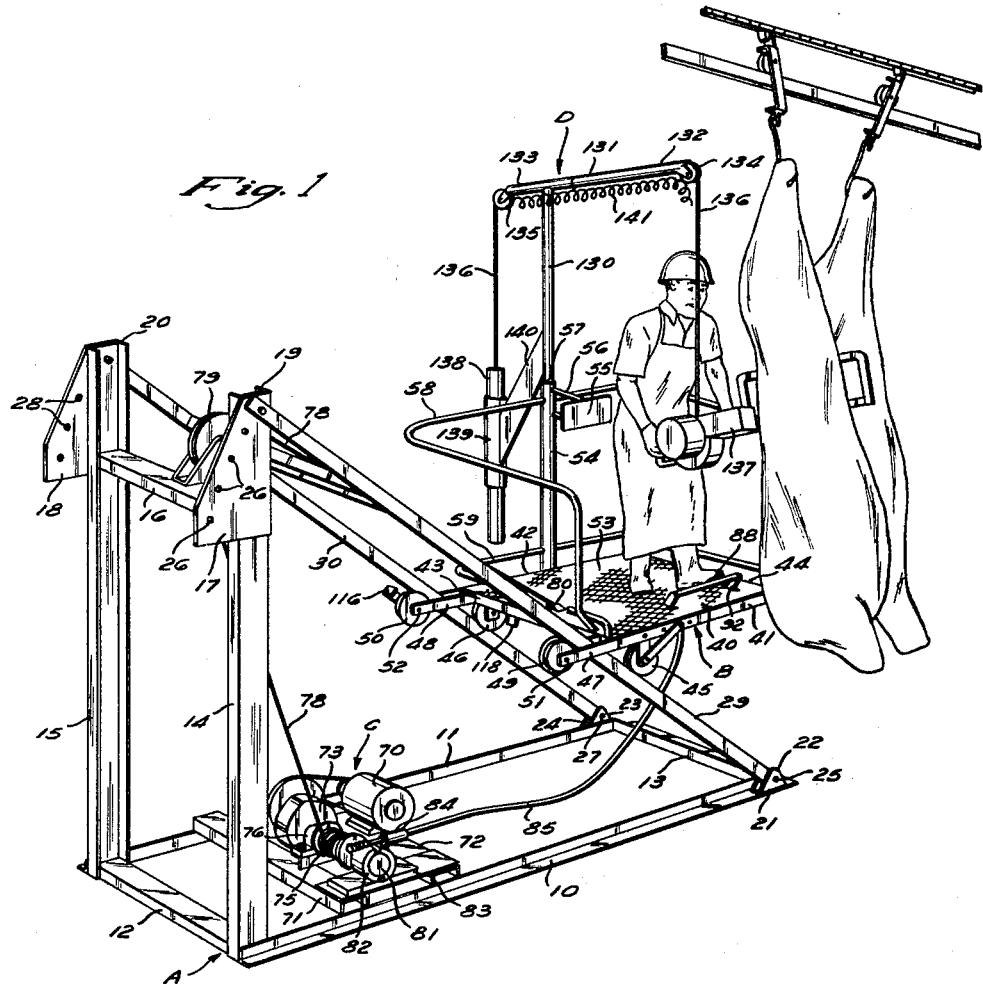
FIG. 1 is a perspective front view of the work station elevator apparatus showing a carcass being split.

Referring to the various figures of the drawing it will be seen that the controlled decline elevator apparatus of the invention comprises structure or unit members as follows: A—an elevator support base having an elevator trackway that is declining or oblique to a horizontal plane; B—an elevator work station with a horizontal positioned platform mounted for movement on said trackway; C—elevator movement control apparatus mounted on said elevator platform and connected to power and braking means attached to said elevator support member; D—an overhead tool support apparatus rotatably mounted on the rear of said elevator platform.

Referring first to FIGS. 1, 2, and 3, the elevator support member A has two parallel bottom side rails, 10 and 11 respectively, and two parallel bottom end rails, 12 and 13 respectively affixed thereto and forming a rectangle preferably approximately eight feet long and two and one-half feet wide. The end rail 12 has two vertical and parallel rails 14 and 15 respectively, fixedly mounted adjacent each end of said rail 12 and preferably extending upwardly approximately six feet. The said rails 14 and 15 have a tie bar 16 mounted below the top end thereof joining them together in a rectangular form.

The said vertical rails 14 and 15 have adjustment plates 17 and 18 respectively mounted on the outer surface thereof adjacent the top ends 19 and 20 of said rails and extending downward to the said tie bar 16.

The said rail 10 has a yoke 21 mounted on the upper surface thereof adjacent the end rail 13 and with its channel walls 22 upwardly positioned and in alignment with said adjustment plate 17. The said rail 11 has a yoke 23 mounted on the upper surface thereof adjacent the end rail 14 and with its channel walls 24 upwardly positioned and in alignment with said adjustment plate 18.

The channel walls 22 of said yoke 21 have a central aperture 25 therethrough, and the adjustment plate 17 has a series of apertures 26 therethrough aligned along an arc of a circle having its center in the said aperture 22 of said yoke 21. The channel walls 24 have a like aperture 27 therethrough, and the adjustment plate 18 has a like series of apertures 28 therethrough.

The said support member A has a declining elevator trackway rail 29 mounted on adjustment plate 17 and yoke 21 and a second declining elevator trackway rail 30 mounted on adjustment plate 18 and yoke 23. The said trackway rail 29 has an aperture adjacent one end thereof to receive a fastening means such as a bolt inserted in the aperture 25 in the walls 22 of yoke 21 and has a second aperture adjacent the other end thereof in alignment with the arcuate series of apertures 26 in the adjustment plate 17 to receive a similar means to secure said rail 29 to the said plate 17. Trackway rail 30 is provided with like apertures adjacent its ends to secure said rail 30 by similar fastening means to the adjustment plate 18 and yoke 23.

When mounted, the said trackway rails 29 and 30 extend in an oblique downward direction from the said adjustment plates to the yoke on the bottom side rails in alignment therewith. It has been found that a 39° angle between the bottom side rails and the respective trackway rails will give satisfactory results for the elevator travel or movement. However, if desired, the trackway angle may be changed by aligning the said rails with different apertures of the series of apertures 26 and 28 in the adjustment plates.

Referring now to said elevator work station member B, the said work station has a horizontally positioned platform 40 having a front 41, a back 42, a side 43 adjacent the trackway rails 29 and 30, and a side 44 remote from said trackway rails.

The platform 40 is provided with flanged wheels 45 and 46 adjustably mounted on the underside thereof adjacent the side 43 and in alignment with the trackway rails 29 and 30 respectively. To hold the platform in a horizontal position on the oblique or declining trackway rails 29 and 30, the platform 40 has a pair of wheel support bars 47 and 48 affixed to the front 41 and back 42 thereof and extending outwardly in alignment therewith to a point adjacent the said trackway rails 29 and 30. Flanged wheels 49 and 50 having their respective axles 51 and 52 affixed to said wheel support bars 47 and 48 are mounted on the bottom or underside of said trackway rails 29 and 30.

The said wheels 45 and 46 that are mounted on the top surface of the trackway rails 29 and 30 and the wheels 49 and 50 that are mounted on the bottom surface thereof are placed so that they serve to maintain the elevator member B in a substantially horizontal position and provide the means whereby said elevator may be easily moved on said trackway rails in an oblique downward or upward direction.

The said platform 40 has a floor 53 provided with a slotted central portion, preferably such as is found in expanded metal to provide the operator with a firm footing as well as to provide drainage from the top surface thereof during the splitting operation.

The platform 40 has a vertical support pipe 54 attached thereto, preferably by bolts, at the midpoint of its back 42 that extends upwardly therefrom approximately three and one-half feet. The said support pipe 54 has an operator's backrest 55 with studs 56, on the rear thereof, for attaching it in spaced relation to the said support pipe 54 adjacent its top 57, so that the front of the backrest 55 is substantially parallel to the front 41 of the platform 40.

The said support pipe 54 has a horizontal guard rail 58 attached thereto adjacent the said backrest 55, that extends across the platform back 42, and in alignment therewith, and forward along the two sides 43 and 44 and preferably several inches beyond the platform 40 as defined by vertical planes passing through sides 43 and 44. The said guard rail 58 has vertical downward extending portions adjacent the front 41 of the platform 40 for attachment thereto, preferably by bolts. The platform 40 has a second and lower horizontal guard rail 59 in substantial vertical alignment with said guard rail 58 and which is attached to the support pipe 54 and platform 40 in like manner, and which serves as a foot guard for the opeartor. The support pipe 54 and guard rails 58 and 59 may be bolted to either side of the platform as desired so that the platform may be used by the operator from either side of the rail.

Referring now to the elevator movement control apparatus member C, there is provided, a power means, preferably an electric motor 70, that is mounted on a pair of transverse rails 71 and 72 having their ends resting on and attached to the bottom side rails 10 and 11 of member A adjacent to and parallel to the bottom end rail 12 thereof. The power from said motor 70 is transmitted by a belt to a gear box 73 to a shaft 74 upon which a cable drum 75 is mounted. The said shaft 74 is mounted so that it is in parallel alignment with the side 43 of the platform 40, in bearings 76 and 77 which have their bases attached to said transverse rails 71 and 72 at each side of said cable drum 75.

The said cable drum 75 carries a cable 78 that passes over a sheave 79 mounted on the tie bar 16 and which then passes downward to the mid-portion of the side 43 of the elevator platform 40 where it is fixedly secured at 80.

The said shaft 74 has an extended end portion 81 remote from the gear box 73, upon which is mounted a brake unit, preferably a piston actuated hydraulic brake unit 82, that has its base 83 mounted on the said transverse rails 71 and 72. The brake unit 82 has a brake actuating cylinder 84 mounted thereon and to which is connected a flexible tube 85 through which brake fluid is carried from said brake cylinder 84 to a master piston cylinder 86 co-operating therewith and which is mounted on the lower surface of the horizontal leaf of an L-shaped bracket 87 having the top edge of its vertical leaf welded to the under side of the floor 53 of the platform 40.

A foot-operated horizontal control bar 88, for actuating said master cylinder 86 is pivotally mounted on the floor 53 of the platform 40. It has a horizontal bar portion 89 and two vertical depending end portions 90 and 91. The floor 53 has two slots 92 therein to receive the said ends 90 and 91 so that the bar portion 89 is positioned near the front 41 of the platform 40 and parallel thereto.

The end 90 of the said control bar is in the form of a bell crank and has an aperture 93 therein adjacent the apex of its angle. The lower arm 94 thereof has a bottom surface 95 slightly arcuate throughout its length and which merges with the lower end surface thereof that is semi-circular across its width. The end 91 has a similar aperture placed at an equal distance from the bar portion 89.

The said control bar 88 has its ends pivotally mounted on the floor 53 by means of bosses 96 and has its horizontal bar portion 89 just a few inches above the floor 53. The said bosses 96 are located on the under surface of said floor 53 adjacent the sides of said slots 92 and having apertures therein to receive fastening means, such as bolts, that pass through like apertures 93 in the control bar ends 90 and 91.

The control bar 88 is connected to the master cylinder 86 through its end 90 by means of a bell-crank lever 97 that is positioned so that a horizontal arm 98 thereof is above and in vertical alignment with the piston rod 99 of said master cylinder 86 and provides a frictional engagement between the upper or outer edge 100 thereof and the bottom surface 95 of arm 94 of said end 90. The second arm 101 of the bell-crank lever 97 is a downwardly extending vertical arm which forms a right angle with the arm 98. The angle edge 102 of the vertical arm 101 engages the end 103 of the piston rod 99.

A horizontal yoke 104 is welded adjacent its closed end to the upper surface of the horizontal leaf of said bracket 87 so that the opening between the yoke arms 105 is in vertical alignment with the piston rod 99 and the horizontal arm 98 of the bell-crank lever 97. The said yoke arms 105 extend outwardly from said bracket 87 to provide a pivotal mounting of said bell-crank lever 97 between the yoke arms 105 adjacent the mid-point of the vertical arm 101 thereof. The pivotal mounting thereof is provided through aligned apertures 106 in said yoke arms 105 and the said vertical arm 101 and the use of bolts or other well known means.

The said yoke arms 105 extend outwardly beyond said vertical arm 101 and are apertured at 107 to provide a pivotal mounting therebetween for a control adjustment bar 108 that is vertically positioned and spaced apart from said vertical arm 101 and which has an aligned aperture therein to receive a bolt passing through the apertures at 107.

The said control adjustment bar 108 has a brake adjustment bolt 109, to engage the vertical arm 101, mounted adjacent its lower end and in end alignment with the piston rod 99. At a similar distance above the pivotal mounting 107 of said bar 108 is a spiral spring 110 which has one end 111 thereof attached to said bar 108. The other end 112 of said spring 110 is adjustably attached to a threaded eye bolt which passes through an aperture in an angle bracket mounted on the platform 40.

The said spiral spring 10 co-acts with the brake unit 82, through the control adjustment bar 108, to hold the elevator member B in a stationary position while the brake is applied. The said spiral spring 110 when mounted, must be of sufficient size, and under sufficient tension, to pivotally move the upper end of control bar 108 away from the vertical arm 101 of lever 97 and move the adjustment bolt 109 into engagement with said vertical arm 101 of lever 97 and move the adjustment bolt 109 into engagement with said vertical arm 101 which in turn will engage and depress the piston of the master brake cylinder 86. This creates the necessary pressure in the brake system to apply the brake of said unit 82 and thereby prevents the cable drum 75 and cable 78 with the elevator member B attached thereto, from moving.

Also, in addition to the force applied to the brake unit 82, the said spring 110 must be of sufficient size to raise the horizontal arm 98 of the bell-crank lever 97 and in turn raise the control bar 88 to its uppermost position.

It will be seen that by applying sufficient foot pressure to the control bar 88 to overcome the force of the spiral spring 110 that the brake of the brake unit 82 will be released in the ratio with which the force of the spring 110 is overcome. This will permit the elevator to descend by gravity on the trackway at any desired speed.

The mechanism comprising the foot-control bar 88, the bell-crank lever 97, the yoke 104 and the control adjustment bar 108 in addition to serving as a brake control unit also serves as the unit to energize the motor 70 when it is desired to raise or lift the said elevator. To accomplish this function, the control adjustment bar 108 has a second adjustment bolt 113 mounted above the spring 110 on the same edge as the first adjustment bolt 109. A push-button electric switch 114 is electrically connected to a motor starter for said motor 70, and when it is energized it energizes said motor 70. The said switch 114 is mounted under the said floor 53 in alignment with said second bolt 113 and is positioned to engage the head of the said second adjustment bolt 113 and energize the starter for motor 70 when the control adjustment bar 108 is pivoted against the force of the spring 110 by depressing the said foot-control bar 88 somewhat beyond the range necessary for the complete release of the brake. This adjustment makes it impossible for the operator to energize the starter for the motor 70 while the brake is applied and also makes it impossible to apply the brake while the motor starter is energized.

Safety features are provided for the elevator work station member C. There is an electrical limit switch 115 connected to the motor starter circuit and adapted to break the circuit when the elevator reaches a safe upper limit on the trackway. It is mounted on the under side of the trackway rail 30 adjacent the upper end thereof and positioned to engage the end of a rod 116 mounted on the wheel bar 48 parallel to the trackway rail 30 and extending upwardly beyond the flange of the trackway wheel 50.

A second electrical toggle switch 117 is mounted on the under side of the tie bar 16 adjacent the cable 78 and which is electrically connected by a separate circuit to an electrically operated solenoid brake 118 mounted on the under surface of the floor 53 adjacent to the trackway wheel 30. The said switch 117 has a wheel 119 mounted on its toggle that engages the said cable 78 under slight tension which maintains an open circuit therein. A break in the cable 78 will release the said tension on the toggle of the switch 117 and close the circuit which will cause the said solenoid to apply the brake to the trackway wheel 30 and thus prevent the elevator from falling or descending out of control.

An additional safety feature is provided to prevent the breakage of control parts through a vertical adjustment bolt 120 mounted on a boss 121 welded to the closed end of the yoke 104 in alignment with the horizontal arm 98 of the bell-crank lever 97 and adjusted to engage the said arm 98 when the arm 98 is depressed sufficiently to cause the adjustment bar 108 to close the push-button switch 114 which energizes the motor starter and said motor 70.

Referring now to the overhead tool support apparatus, member D, there is provided a vertical support tube 130 or gin pole rotatively mounted in the said support pipe 54 and extending above the operator and having a horizontal tubular tool support portion 131 attached intermediate its ends to the top of the vertical support tube 130. The forward longer tool carrying portion 132 of said horizontal portion 131 extends to approximately the front 41 of the platform 40 and the rearward shorter portion 133 thereof extends somewhat beyond the rear of the platform 40. A sheave 134 is mounted at the end of the forward portion 132 of said horizontal portion 131 and a like sheave 135 is mounted at the end of the rearward portion 133 thereof. The said sheaves 134 and 135 carry a plastic coated wire rope 136 having a tool, such as an electric saw 137 attached to its forward end and a counterweight 138 such as a cylinder with a vertical axis and a wire rope attaching means on its upper end, attached to its rearward end.

The said counterweight 138 is slidably positioned within a tubular casing 139. The said tubular casing 139 is provided with struts 140 or other usual means, mounted along its side which are fixedly attached to the vertical support tube 130 or gin pole, so that it will move as the said support tube 130 moves, thus keeping the said counterweight in alignment with the sheave 135 as the operator moves the tool during the splitting or other operation.

The electric power line for the tool being used, preferably of the spiral coil type 141, may be attached to the said horizontal portion 131 adjacent the sheaves 134 and 135. This will permit the said power line 131 to follow the downward cut of a splitting saw or other tool during the cutting operation without undue strain on the wiring or the insulation thereof.

For use, the carcass splitting work station machine of the invention is placed in the carcass carrying conveyor line, so that the carcass will pass along the front 41 of the platform 40 within easy arms reach of the carcass splitter and with the oblique trackway rails 29 and 30 descending in the direction of travel of the overhead carcass carrying conveyor.

During the splitting operation of the machine, the carcass splitter on the approach of a carcass depresses the foot-control bar 88 to the lower limit. This releases the brake and energizes the motor starter and said motor 70 which lifts the elevator work station to the heighth desired when the foot control is released. It will be seen that upon the release of the foot control bar 88 the brake is applied which will hold the work station motionless until the carcass reaches the work station. Since the carcass is hanging from its hind legs the splitter starts sawing the carcass in half from that point. As the saw progresses downward he depresses the foot-control bar 88 sufficiently to release the brake and allow the work station to descend obliquely by gravity as the carcass moves on the conveyor as desired by the carcass splitter.

When the carcass has been halved the foot-control bar 88 again may be fully depressed to lift the work station to be in readiness for the next following carcass.

Although the foregoing description is necessarily of detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A carcass splitting elevator work station machine comprising:
   (a) an elevator support base having a rectangular horizontal base section and a rectangular vertical end section,
   (b) elevator trackway rails adjustably mounted, obliquely to a horizontal plane, on the said elevator support base and secured thereto,
   (c) an elevator work station provided with a horizontal work station platform for the operator and his tools,
   (d) guard rails mounted on said platform,
   (e) flanged trackway wheels adjustably mounted on said platform to receive said trackway rails for upward and downward movement thereon,
   (f) a motor mounted on said support base for lifting said elevator work station,
   (g) a hydraulic brake unit mounted on said support base for controlling the descending movement of said elevator work station,
   (h) a cable drum mounted on said elevator support base horizontal section,
   (i) said motor and hydraulic brake unit being connected to said cable drum,
   (j) elevator control means mounted on said platform and connected to said motor and brake means,
   (k) said elevator control means having a control bar having its ends pivotally mounted on the floor of said platform and a horizontal section spaced above the said floor and having a linkage connection with a hydraulic master brake cylinder and an electric power actuating switch mounted below the floor of said platform,
   (l) a sheave affixed to the top of said vertical end section of said elevator support base,
   (m) a cable passing over said sheave and connecting said elevator work station platform with the cable drum, and
   (n) an overhead tool support apparatus mounted on said elevator platform.

2. The structure as defined in claim 1 wherein the overhead tool support apparatus comprises a rotatively mounted vertical support post and a horizontal tubular portion mounted atop thereof, a sheave mounted on each end of said horizontal tubular portion, a tool carrying cable passing over said sheaves and connecting a tool suspended over the platform and a counterweight therefor suspended over the rear of said platform.

3. The structure as defined in claim 1 and further including a vertical support pipe removably mounted on the rear of said platform, a back rest secured thereto, and horizontal guard rails secured thereto for mounting on said elevator platform and removably secured thereto.

4. The structure as defined in claim 1 and further including a limit switch connected to said motor mounted on a said trackway rail adjacent its upper end to break the motor circuit upon contact between said limit switch and said elevator platform, an electric safety brake mounted on said platform adjacent said trackway wheels, a safety switch mounted on said vertical end portion of said support base and engaging said cable and electrically connected to said safety brake whereby said safety switch will energize said safety brake and apply the brake on the said trackway wheels if the cable becomes slack for any reason.

5. A carcass splitting elevator work station machine comprising:
   (a) an elevator support base having a rectangular horizontal base section and a rectangular vertical end section,
   (b) elevator trackway rails mounted, obliquely to a horizontal plane, on the said elevator support base and secured thereto,
   (c) an elevator work station provided with a horizontal work station platform,
   (d) flanged means on said platform to receive said trackway rails for upward and downward movement thereon,
   (e) an electric motor mounted on said support base for lifting said elevator work station,
   (f) a hydraulic brake unit mounted on said support base for controlling the descending movement of said elevator work station,
   (g) a cable drum mounted on said elevator support base horizontal section,
   (h) said motor and hydraulic brake unit being connected to said cable drum,
   (i) said elevator control means having a foot-operated control bar having its ends pivotally mounted on the floor of said platform and a horizontal section spaced above the said floor, an L-shaped bracket mounted below said floor adjacent one depending end portion of said control bar, a yoke welded on said bracket, a bell-crank lever having a vertical arm and a horizontal arm, said horizontal arm thereof slidably engaging said depending end portion of said control bar, said vertical arm thereof pivotally mounted on said yoke, a master hydraulic brake cylinder mounted on said bracket below said yoke with the piston rod thereof in alignment with and engaging said vertical arm of said bell-crank lever, a vertical adjustment bar pivotally mounted on said yoke remote from said bracket, an adjustment bolt mounted on said adjustment bar adjacent its lower end for adjustably engaging said vertical arm, a control spring for said adjustment bar having one end thereof mounted adjacent its upper end and the other end thereof adjustably mounted under tension on said platform whereby the said spring causes the adjustment bar through said linkage to create pressure in said master brake cylinder and raise said foot-control bar,
   (j) said elevator control means having a second adjustment bolt mounted on said adjustment bar opposite said spring, a switch electrically connected to said motor and mounted under said platform in alignment with said second adjustment bolt and adapted to adjustably engage said switch to energize said motor when said control bar is depressed,
   (k) cable carrying means affixed to the top of said vertical end section of said elevator support base,
   (l) a cable passing over said cable carrying means and connecting said elevator work station platform with the cable drum, and (m) an overhead tool support apparatus mounted on said elevator platform.

6. An incline and decline work station machine adapted for traveling alignment with a work in process conveyor as described comprising:

(a) a work station support base having a rectangular horizontal base section and a rectangular vertical end section, (b) work station trackway rails mounted, obliquely to a horizontal plane, on the said support base and secured thereto and forming an acute angle not exceeding sixty degrees with said horizontal base section, (c) a work station provided with a horizontal platform for the operator and his tools, (d) means on said platform to receive said trackway rails for upward and downward movement thereon, (e) power means mounted on said support base for lifting said work station, (f) brake means mounted on said support base for holding and controlling the descending movement of said work station, (g) connecting means between said work station platform and said power and brake means, and (h) unitary control means mounted on said platform and connected to said power and brake means for controlling the movement of said work station, (i) said unitary control means including a control bar, linkage means engaging said bar and power and brake actuating means connected therewith and operable in a first position to apply and release said brake means and in a second position to energize said power in accordance with the relative position of said control bar whereby the upward and downward movement of the work station may be controlled.

7. The structure as defined in claim 6 wherein the means on said platform to receive said trackway rails are flanged wheels.

8. The structure as defined in claim 6 wherein the trackway rails are adjustably mounted on said work station support base whereby the angle of descent of the work station may be increased or decreased.

9. The structure defined in claim 6 wherein the work station control means comprises a control bar having its ends pivotally mounted on the floor of said platform and a horizontal section spaced above the said floor and having a linkage connection with a hydraulic master brake cylinder and a power actuating electric switch mounted below the floor of said platform.

10. The structure as defined in claim 6 wherein the connecting means between said platform and said power and brake means is a cable extending from said platform to a cable drum mounted on said support base and rotatively connected to said power and brake means.

11. The structure as defined in claim 6 and further including a tool support means mounted on said work station platform.

12. An incline and decline work station machine adapted for traveling alignment with a work in process conveyor as described comprising:

(a) a work station support base having a rectangular horizontal base section and a rectangular vertical end section, (b) work station trackway rails mounted, obliquely to a horizontal plane, on the said support base and secured thereto and forming an acute angle not exceeding forty-five degrees with said horizontal base section, (c) a work station provided with a horizontal platform for the operator and his tools, (d) means on said platform to receive said trackway rails for upward and downward movement thereon, (e) power means mounted on said support base for lifting said work station, (f) brake means mounted on said support base for holding and controlling the descending movement of said work station, (g) a cable drum mounted on said horizontal section of said work station support base, (h) said power and brake means being connected to said cable drum, (i) unitary control means mounted on said platform, and connected to said power and brake means for controlling the movement of said work station, (j) said unitary control means including a control bar, linkage means engaging said bar and power and brake actuating means connected therewith and operable in a first position to apply and release said brake means and in a second position to energize said power means in accordance with the relative position of said control bar whereby the upward and downward movement of the work station may be controlled, (k) cable carrying means affixed to the top of said vertical end section of said support base, and (l) a cable passing over said cable carrying means and connecting said work station platform with the cable drum.

13. The structure as defined in claim 12 wherein the cable carrying means for the cable connecting said work station platform with the cable drum is a sheave.

14. The structure as defined in claim 12 and further including a vertical support pipe, an adjustable back rest secured thereto, and detachable horizontal guard rails secured thereto for mounting on said work station platform and removable for right and left hand operations.

15. The structure as defined in claim 12 and further including a tool support means mounted on said work station platform.

References Cited by the Examiner
UNITED STATES PATENTS

| | | | |
|---|---|---|---|
| 1,668,500 | 5/28 | Gillespie | 187—10 |
| 2,286,372 | 5/42 | Page | 182—129 |
| 2,446,972 | 8/48 | Wyen | 182—129 |
| 2,943,708 | 7/60 | Sasgen | 187—10 |
| 2,989,140 | 6/61 | Hill | 182—148 |
| 3,112,009 | 11/63 | Langer | 182—63 |

HARRISON R. MOSELEY, *Primary Examiner.*